(12) United States Patent
Tillotson et al.

(10) Patent No.: US 7,365,674 B2
(45) Date of Patent: *Apr. 29, 2008

(54) AIRBORNE WEATHER PROFILER NETWORK

(75) Inventors: Brian J. Tillotson, Kent, WA (US); Jay S. Pearlman, Port Angeles, WA (US); David A. Whelan, Newport Beach, CA (US)

(73) Assignee: The Boeing Company, Chicago, IL (US)

(*) Notice: Subject to any disclaimer, the term of this patent is extended or adjusted under 35 U.S.C. 154(b) by 276 days.

This patent is subject to a terminal disclaimer.

(21) Appl. No.: 11/235,371

(22) Filed: Sep. 26, 2005

(65) Prior Publication Data

US 2007/0073486 A1 Mar. 29, 2007

(51) Int. Cl.
*G01S 13/95* (2006.01)

(52) U.S. Cl. ............. 342/26 B; 342/115; 342/195

(58) Field of Classification Search ............. 342/26 B, 342/115, 195
See application file for complete search history.

(56) References Cited

U.S. PATENT DOCUMENTS

| | | | |
|---|---|---|---|
| 4,521,857 A | 6/1985 | Reynolds, III | |
| 4,990,922 A * | 2/1991 | Young et al. | 342/26 B |
| 5,077,558 A * | 12/1991 | Kuntman | 342/26 B |
| 5,276,453 A * | 1/1994 | Heymsfield et al. | 342/112 |
| 5,592,171 A | 1/1997 | Jordan | |
| 5,757,322 A | 5/1998 | Ray et al. | |
| 5,796,471 A | 8/1998 | Wilkerson et al. | |
| 6,018,699 A | 1/2000 | Baron, Sr. et al. | |
| 6,028,514 A | 2/2000 | Lemelson et al. | |
| 6,043,756 A | 3/2000 | Bateman et al. | |
| 6,184,816 B1 | 2/2001 | Zheng et al. | |
| 6,308,650 B1 | 10/2001 | Tsumiyama et al. | |
| 6,456,226 B1 | 9/2002 | Zheng et al. | |
| 6,505,123 B1 | 1/2003 | Root et al. | |
| 6,563,452 B1 | 5/2003 | Zheng et al. | |
| 6,707,415 B1 | 3/2004 | Christianson | |
| 6,754,585 B2 | 6/2004 | Root et al. | |
| 6,799,014 B2 * | 9/2004 | Rosen et al. | 455/12.1 |
| 6,826,481 B2 | 11/2004 | Root et al. | |
| 7,181,345 B2 * | 2/2007 | Rosenfeld et al. | 702/3 |
| 2002/0039072 A1 | 4/2002 | Gremmert et al. | |
| 2002/0168974 A1 * | 11/2002 | Rosen et al. | 455/429 |
| 2004/0043760 A1 * | 3/2004 | Rosenfeld et al. | 455/414.3 |
| 2005/0228763 A1 * | 10/2005 | Lewis et al. | 706/1 |
| 2006/0121893 A1 * | 6/2006 | Tillotson et al. | 455/431 |

(Continued)

OTHER PUBLICATIONS

Mizutani, K. et al. "Development of Coherent Doppler Lidar at CRL" Proceedings of the Spie—The International Society for Optical Engineering Spie—Int. Soc. of Eng USA, vol. 4893, 2003, pp. 311-318.

(Continued)

*Primary Examiner*—Dan Pihulic
(74) *Attorney, Agent, or Firm*—Harness, Dickey & Pierce, P.L.C.

(57) ABSTRACT

Apparatus and methods for remotely sensing meteorological conditions and for building models from the sensed conditions. More particularly, networks and systems are provided for gathering remotely sensed profiles of the meteorological conditions and for building the meteorological model. The networks and systems can also predict the weather. Also, various remote profilers are provided including LIDAR, RADAR, nano-sondes, microwave, and even GPS (Global Positioning System) related instruments.

17 Claims, 9 Drawing Sheets

U.S. PATENT DOCUMENTS

| | | | |
|---|---|---|---|
| 2007/0069941 A1* | 3/2007 | Pearlman et al. | 342/26 B |
| 2007/0073486 A1* | 3/2007 | Tillotson et al. | 702/3 |
| 2007/0162328 A1* | 7/2007 | Reich | 705/14 |

OTHER PUBLICATIONS

Yee, Y. et al. "Neural Networks for Sensor Fusion of Meteorological Measurements" Proceedings of the Spie—The International Society for Optical Engineering Spie—Int. Soc. Eng USA, vol. 4385, 2001, pp. 77-86.

"Global Climate Research: Atmospheric Radiation Measurement-Unmanned Aerospace Vehicle (ARM-UAV)" Sandia National Laboratories Fact Sheet, [Online] Jun. 2004. Retrieved from the Internet: UR::http://www.ca.sandia.gov/pubs/factsheets/ARM-UAV2004.pdf, retrieved on Jan. 19, 2007, the whole document.

Strahl, Jennifer et al. "Nowcast For The Next Generation Navy: Recent Progress In Naval Nowcast Technology" 20th International Conference On Interactive Information and Processing Systems (IIPS) For Meteorology, Oceanography, and Hydrology, [Online] Jan. 12, 2004. Retrieved from the Internet: URL:http://ams.confex.com/ams/pdfpapers/69718.pdf, retrieved on Jan. 19, 2007.

Wilkerson, T. et al. "Lidar Profiling of Aerosols, Clouds, and Winds by Doppler and Non-Doppler Methods" Amos Conference, Maui, HI, [Online] Oct. 2002. Retrieved from the Internet: URL:http://harlie.gsfc.nasa.gov/IHOP2002/Pub&Pats/AMOS%202002%20final.pdf, retrieved on Jan. 19, 2007.

International Search Report and Written Opinion, International Application No. PCT/US2006/037746 mailed May 14, 2007.

Cordes, J.J. and Flanagan, A., 1995: *Economic Benefits and Costs of Developing and Deploying a Space-based Wind Lidar*, Final Report, NWS Contract No. 43AAnW400223. George Washington University.

Masters, Dallas, et al., *GPS Signal Scattering from Land for Moisture Content Determination*, date unknown, 3 pgs.

Garrison, James L. and Katzberg, Stephen J. *The Application of Reflected GPS Signals to Ocean Remote Sensing*, Remote Sensing of Environment (2000), pp. 175-187, vol. 73, Elsevier Science Inc., New York USA.

Rocken, Christian, *Special Study Group 2.161 Report Report Probing the Atmosphere by GPS*; date unknown, pp. 1-12, COSMIC program Office University Corp. for Atmospheric Research (UCAR), Boulder, CO USA.

http://www.ghcc.msfc.nasa.gov/sparcle/sparcle_quotes2.html, *Are Space-Based Global Winds Desired?Sparkle Quotes* (2) NASA, May 20, 2005.

http://www.ipo.noaa.govl, *What Is NPOESS*? NOAA Satellite and Information Service, May 20, 2005, pp. 1-3.

* cited by examiner

AIRBORNE WEATHER PROFILER NETWORK

FIELD OF THE DISCLOSURE

This disclosure relates generally to meteorological sensors and models and, more particularly, to meteorological profilers for use in gathering data for building the models.

BACKGROUND

Current meteorological models are limited in their capabilities by the quality and quantity of available weather data. In particular, the sensors that gather weather data are few and far between in remote areas such as deserts, the polar regions, and oceans. The Eastern Pacific Ocean is one such example and has only a few weather buoys scattered along thousands of miles of United States coast. Since weather moves in from the Pacific in the western United States, the lack of data regarding the weather over the Pacific hinders the ability of forecasters to predict the weather in these coastal areas. Furthermore, while conditions near the ground can be readily sensed, conditions aloft can only be sensed remotely or on limited occasions (e.g. during the ascent of a radiosonde). Moreover, weather conditions can change rapidly thereby rendering what data has been gathered stale and inaccurate. For these reasons, among others, a need exists to improve the quality and quantity of readily accessible weather data.

SUMMARY

It is in view of the above problems that the present disclosure was developed. The disclosure provides remote profilers and methods for sensing the profiles of atmospheric properties. Additionally, the disclosure provides apparatus and methods for building weather models from weather data collected by the profilers.

These weather models typically include data regarding the current winds, pressure, temperature, humidity or moisture content, precipitation, insolation, surface conditions, cloud interior conditions, soil moisture, particulate concentrations, and the presence or likelihood of turbulence, icing, lightning, and the like. Mathematical fields and profiles (as appropriate) of these properties may also be included in the models. The models, and the forecasts derived therefrom, may be provided to end users for planning activities that may be affected by the weather. For instance, aircraft operators are particularly interested in the possibility that icing or turbulence might occur. When the aircraft operators become aware that these conditions are imminent they can take precautions such as preparing de-icing equipment for use or re-routing flights around the affected area. Improving the data available with which to build weather models will therefore enable the improvement of many types of operations.

In a first embodiment, the present disclosure provides a computer network for building weather models from the meteorological property profiles. The network of the current embodiment includes remote profiling instruments (e.g., "vertical profilers") mounted on commercial aircraft, unmanned aerial vehicles, or other mobile platforms which are networked together via a communications network or system. Each of the vehicles therefore represents a sensing node of the network. Since the sensing nodes are mobile, the present disclosure allows gathering profiles over a larger region than was heretofore possible. A modeling node with a processor communicates with the sensing nodes to receive the gathered profiles and use them as inputs to a three dimensional weather model. The processor can also use the model to forecast the weather in the region where the profiles were gathered or even over adjacent areas.

In a second embodiment, the present disclosure provides a system for modeling and forecasting weather. The current embodiment includes a set of sensing nodes which include manned aircraft, UAVs, and/or ground vehicles. Each sensing node is equipped with a remote profiler using, for instance, RADAR (radio detection and ranging) or LIDAR (laser detection and ranging) to sense the profile of an atmospheric property. In the alternative, microwave sounders can be used to sense the profile of an atmospheric property. Another alternative is to use the scintillation of a GPS (Global Position System or other positioning system signal) to sense the profile along the signal path between the transmitting station and the receiver.

For airborne sensing nodes, the current embodiment includes remote profilers that are modified to meet the weight, power, and other constraints of the aircraft. Each sensing node (whether airborne or not) is also equipped with a communication device that allows it to communicate with other nodes, either directly or via an external network. Exemplary networks for this use include the Connexion by Boeing™ network and digital air traffic networks. At least one node is equipped with a computing device that is programmed to perform weather modeling. While this node is generally referred to as a modeling node, it too may be a sensing node equipped with a remote profiler.

In operation, each sensing node of the current embodiment continuously measures a profile of a meteorological property. Note that the profile may be sensed either above or below the altitude of the sensing node or at any angle relative to the orientation of the sensing node. The sensing nodes transmit the resulting weather observations (including the location and time of the observations) to the modeling node. When the modeling node has sufficient data to build a model, it executes a modeling algorithm to create a three dimensional map, or model, of the current atmosphere in the region (a "nowcast"). In another embodiment, the model also creates a forecast based on the three dimensional model. Additionally, the modeling node sends relevant subsets of the model to user nodes (e.g., aircraft and air traffic control centers), some of which may also be sensing nodes.

In a third embodiment, the present disclosure provides a network that includes mobile sensing nodes and a modeling node. The sensing nodes each include a remote profiler for sensing the profile of an atmospheric property. Data regarding the sensed profile is sent from the sensing node to the receiving node which uses the data to determine a model of the weather. Preferably, the network is an airborne WAN (wide area network) over which the processor communicates the resulting model to the end users including, potentially, the sampling nodes. Moreover, the network may include a publish-subscribe architecture. Optionally, the processor may forecast the weather based in part on the sensed profiles. In an embodiment, one of the sensing nodes is an aircraft that operates over remote areas. Also, the modeling node can include both the processor and a remote profiler such that the modeling node is also a sensing node.

In yet another embodiment, the present disclosure provides a method of building a meteorological model. The method includes using mobile sensing nodes to remotely sense profiles of atmospheric properties. Preferably, the sensing nodes are aircraft that operate over geographically remote areas thereby "sweeping" the sensed profiles through the atmosphere. From wherever the sensing nodes operate, the sensed profiles are communicated to a modeling node and, preferably, over an airborne wide area network. In any case, from the sensed profiles, a weather model is determined by a processor of the modeling node. The resulting model can be published via a publish-subscribe architecture of the WAN. Optionally, the weather may be forecast using the sensed profiles.

In still another embodiment, a LIDAR wind velocity profiler is provided. The profiler of the current embodiment includes a laser, an optical switch, a plurality of apertures, and a detector. The optical switch has an input port and a plurality of output ports with which the plurality of apertures are optically coupled. The laser, of course, is coupled with the input port of the optical switch. Thus, the laser transmits laser energy to the optical switch which couples the laser energy with the apertures. The laser energy passes through the aperture and illuminates a portion of the atmosphere thereby generating a return signal. The detector receives the return signals associated with the aperture(s) and thereby senses the wind velocity.

In other embodiments additional remote profilers are provided by the present disclosure. For instance, in one embodiment a profiler is provided that includes a MEMS (Micro Electro Mechanical System) sensor, a transmitter, and an antenna. The MEMS sensor generates a signal indicative of the sensed condition. The transmitter and antenna serve to transmit the signal for reception by a receiver. In addition, the antenna is configured to resonate at a RADAR frequency.

Further features and advantages of the present disclosure, as well as the structure and operation of various embodiments of the present disclosure, are described in detail below with reference to the accompanying drawings.

The accompanying drawings, which are incorporated in and form a part of the specification, illustrate exemplary embodiments of the present disclosure and together with the description, serve to explain the principles of the disclosure. In the drawings.

DETAILED DESCRIPTION OF THE EMBODIMENTS

Figure 1:
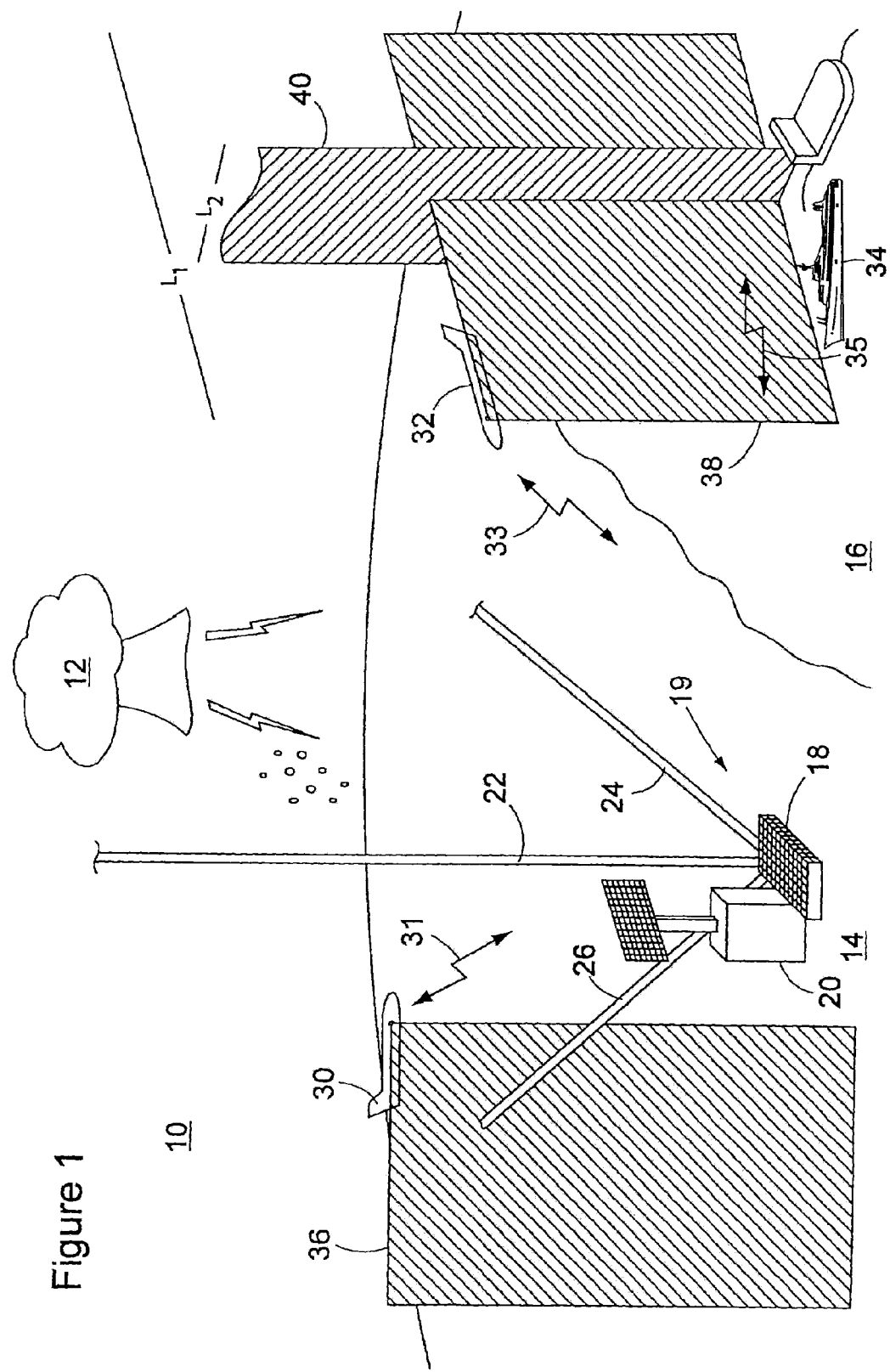
FIG. 1 illustrates a system constructed in accordance with the principles of the present disclosure.

Referring to the accompanying drawings in which like reference numbers indicate like elements, FIG. 1 illustrates an integrated system for remotely sensing the profiles of meteorological properties and creating meteorological models from the sensed profiles. The exemplary system shown in FIG. 1 is configured to sense conditions in the atmosphere 10 in order to detect, model, and forecast the weather which is shown schematically as a cumulonimbus cloud (i.e., a thunderstorm) 12. Of course, the weather 12 can occur over both land areas 14 and bodies of water 16. Of particular interest are remote areas such as deserts, the polar regions, and the oceans.

A weather station 19 is shown as including a vertical profiler 18 and an instrument tower or equipment shack 20. The vertical profiler 18 shown is a conventional RADAR vertical profiler. It operates by transmitting a vertical beam 22 of electromagnetic radiation through the atmosphere and sensing the signals returned from the portion of the atmosphere 10 through which the radiation travels. In a well known manner, the vertical beam 22 allows the vertical profiler to sense, for example, the vertical wind speed at various altitudes along the path of the beam 22. The exemplary vertical profiler 18 also transmits orthogonal beams 24 and 26 to sense the horizontal components of the winds aloft. Of course, the vertical profiler 18 could be used to sense a variety of atmospheric properties including, but not limited to, temperature and liquid water content (e.g., rain droplets).

With continuing reference to FIG. 1, the system also includes remote profilers that are modified to comply with the constraints associated with various mobile platforms such as the aircraft 30 and 32 and the marine vehicle or ship 34. Because these vehicles 30, 32, and 34 move, the onboard profilers no longer stare at a fixed column of the atmosphere 10. Rather, the sensed profiles resulting from these measurements sweep through the atmosphere 10 thereby forming curvilinear surfaces 36, 38, and 40 along which the meteorological properties are sensed by the profilers (onboard the vehicles 30, 32, and 34 respectively).

Since the weather can be assumed to be relatively stable for some finite time, any given measurement will remain valid, or "fresh," for some time after it is made. As a result, the mobility of the profilers increases the amount of available weather data.

By way of comparison, the stationary vertical profiler 18 will continue to take repetitive measurements of the atmospheric property directly above it. In contrast, even a relatively slow moving vehicle such as the ship 34 will move from one location to the next gathering new data as it travels. Similarly, a relatively fast vehicle such as the aircraft 32 rapidly moves between new positions thereby quickly gathering new data. The difference in the amount of data that rapidly moving, slowly moving, and stationary profilers gather is shown schematically by the length "$L_1$ and $L_2$" of the curvilinear surfaces 38 and 40 and the narrow width of the RADAR beam 22. These lengths "$L_1$ and $L_2$" are defined by the current position of the profiler on the leading edge and, on the trailing edge, by the length of time for which the gathered data can be considered fresh.

It is preferred to place the profilers on mobile platforms such as the aircraft 30 and 32 in part because these vehicles travel long distances quickly. Some aircraft 30 and 32 can traverse 12,000 kilometers during a non stop trip. These track lengths are convenient because a preferred measurement spacing is about 25 kilometers between measurements for many meteorological phenomenon. Even at a much closer measurement spacing of about 1 kilometer the profilers provided by the present disclosure are able to respond quickly enough to provide meaningful weather data.

FIG. 1 also shows still another feature provided by the present disclosure. Since previous vertical profilers have a fixed position they do not sweep out curvilinear surfaces as do the profilers provided by the present disclosure. Moreover, since previously available vertical profilers are generally separated by significant distances, the beams 22, 24, and 26 of one vertical profiler do not intersect the beams 22, 24, and 26 of another vertical profiler. In contrast, because of the large number of exemplary vehicles 30, 32, and 34 on which the profilers of the present disclosure can be mounted, it is certain that on occasion some of the resulting curvilinear surfaces will intersect as shown by the intersection of surfaces 38 and 40. Such intersections of the swept surfaces 38 and 40 allow the corresponding profilers to calibrate each other via comparison of the sensed profiles along the intersection of the surfaces 38 and 40. Additionally, on occasion, some of the surfaces 36, 38, and 40 may be caused to over fly the ground station 19 thereby calibrating the ground station's profiler 18.

Still with reference to FIG. 1, a communications system between the various vehicles 30, 32, and 34 is shown schematically by a set of radio links 31, 33, and 35 and the weather station 19. The radio links 31, 33, and 35 can of course be bi-directional. These links allow each of the vehicles 30, 32, and 34 to transmit the data regarding the swept profiles 36, 38, and 40 to the weather station 19 for further processing. In keeping with that aspect of the present disclosure, the weather station 19 can include a processor for combining the swept profiles 36, 38, and 40 into a model of the weather in the region of the vehicles 30, 32, and 34. Furthermore, while the vehicles 30, 32, and 34 are shown as communicating to the stationary weather location 19, any one of the vehicles 30, 32, and 34 could instead include the model building processor. Therefore, the bi-directional radio links 31, 33, and 35 would be directed to that particular node. In any case, the radio links 31, 33, and 35 also allow the model to be transmitted to potential end users such as the crew of the vehicles 30, 32, and 34.

Figure 2:
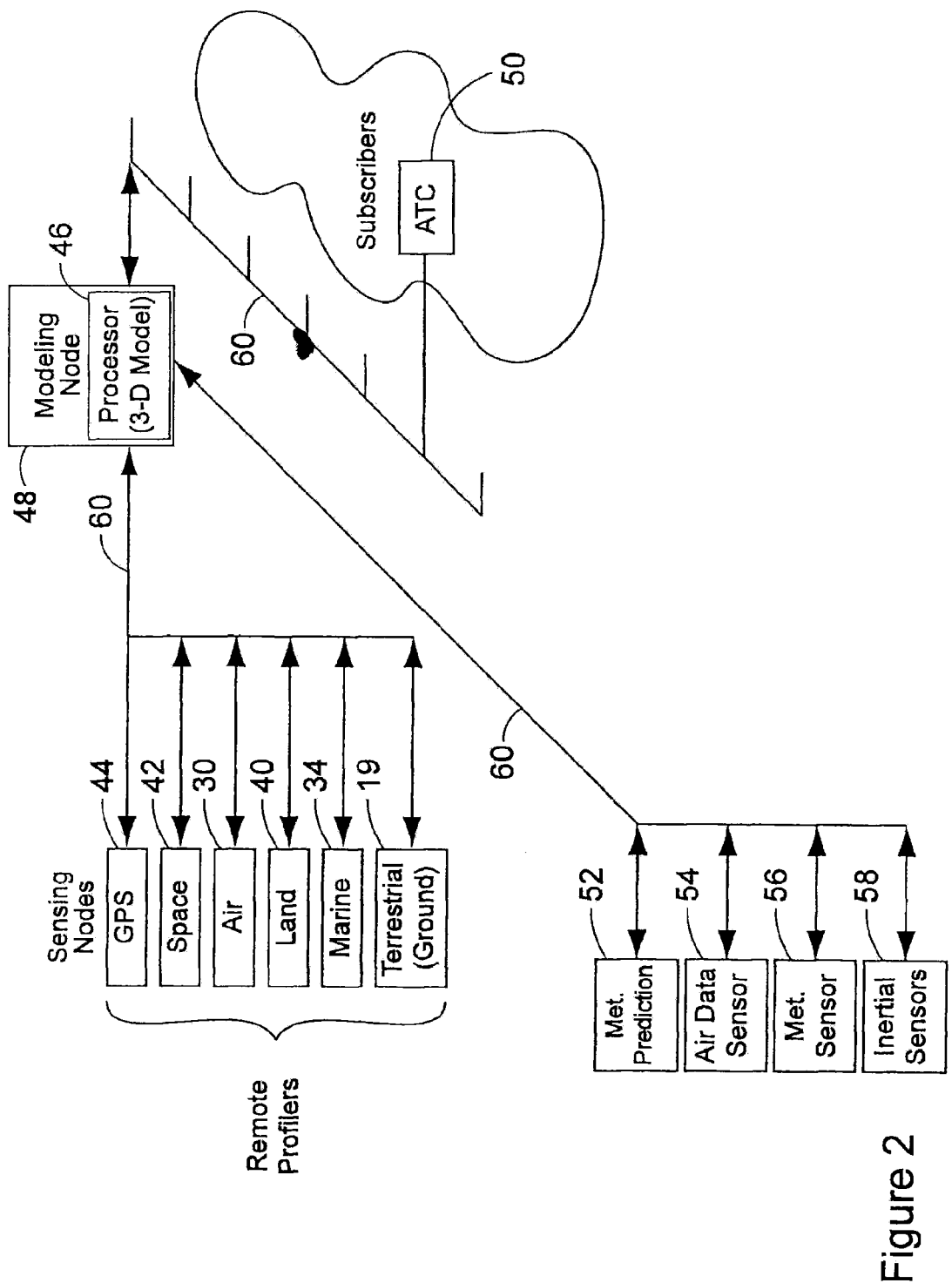
FIG. 2 illustrates a network of a embodiment of the present disclosure.

With reference now to FIG. 2, a network constructed in accordance with the principles of the present disclosure is illustrated. The network includes a variety of sampling nodes such as the terrestrial weather station 19, the aircraft 30, the ship 34, a land vehicle (e.g. a truck with meteorological instruments onboard) 40, a meteorological satellite 42, and a GPS receiver 44 (with modifications to permit it to remotely sense the weather). For more information regarding the use of a GPS receiver to gather meteorological data see U.S. patent application Ser. No. 11/003,868 filed on Dec. 3, 2004 by Tillotson and entitled System For Measuring Turbulence Remotely which is incorporated herein as if set forth in full. The network also includes a modeling node 48 with a processor, an end user 50 and various supplemental meteorological data sources. These other sources include, but are not limited to, a source of meteorological predictions (e.g., the United States National Weather Service) 52, an air data sensor 54 aboard an aircraft, a meteorological station or sensor 56, and inertial sensors 58 (also onboard an aircraft). All of these devices are interconnected as shown via a communication network 60 that may include one or more airborne segments. In an embodiment the communication network 60 includes segments of the Connexion by Boeing$^{SM}$ system or of a digital air traffic control system.

In operation, the various meteorological data sources or sampling nodes (devices 19, 30, 32, 34, 40, 42, 44, 52, 54, 56, and 58) gather meteorological data. Of course, any or all of these devices may include a remote profiler and may transmit the gathered weather data to the modeling node 48 via the network 60. Using the received data, and in particular the remote profiles, the modeling node 48 creates a three dimensional model of the weather in the region near the devices.

Further, the modeling node 48 may also distribute the model over the network 60 to the various end users 50. These end users 50 may include the devices 19, 30, 32, 34, 40, 42, 44, 52, 54, 56, and 58 (or the crews thereof). One particular end user 50 is the Air Traffic Control System, its Air Traffic Control Centers, and their users. To reduce traffic on the network 60, the modeling node may be configured as a publisher with the end users 50 acting as subscribers in a publish-subscribe architecture. Moreover, the modeling node 48 may organize the weather model to correspond to smaller regions in which one, or more, of the end users 50 may be interested. In this manner, the modeling node 48 may publish subsets of the model to those end users 50 not wishing to receive the complete model.

As alluded to earlier, a large number of sensors and sensor types can be incorporated in the system illustrated in FIG. 1 and the network illustrated in FIG. 2. Thus, a number of novel sensors for use in the systems and networks provided by the present disclosure will now be briefly described. Generally, these instruments will be referenced using the term "remote profilers." A remote profiler for the purposes of the present application is a sensor that can sense a property of the atmosphere at some distance from the sensor. Generally, these sensors operate in such a manner that the distance from the sensor to the location where the property is sensed can also be determined. Thus vertical profilers are one type of remote profiler. However, a remote profiler need not sense properties along a vertical path. Rather, remote profilers are envisioned that can sense atmospheric properties along any direction (vertical, horizontal, or any oblique angle thereto.) Moreover, for those embodiments that include a remote profiler onboard a mobile platform, the direction in which the sensor senses the property (i.e., the direction that the sensor "points") is not necessarily constrained by the orientation of the platform. That is, the sensor may point in any direction relative to the orientation of the mobile platform.

Figure 3:
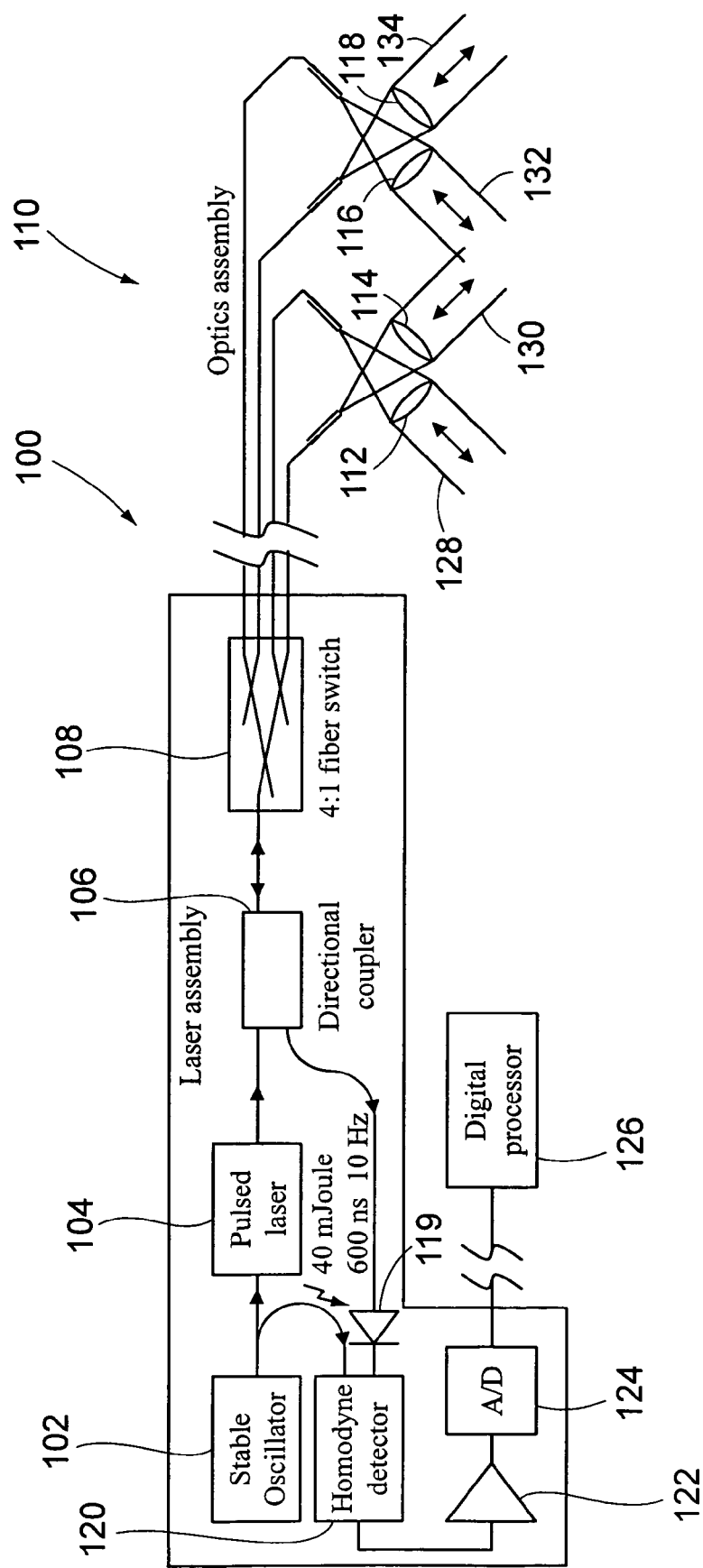
FIG. 3 illustrates a embodiment of a remote profiler constructed in accordance with the principles of the present disclosure.

Turning now to FIG. 3, an embodiment of a LIDAR (Laser Detection and Ranging) wind sensor is shown. The LIDAR sensor 100 shown includes a stable oscillator 102, a pulsed laser 104, a bi-directional coupling 106, a fiber switch 108, an optics assembly 110 (that contains four lenses 112, 114, 116, and 118), a photo detector 119, a homodyne detector 120, an amplifier and signal conditioner 122, and an analog to digital converter 124. The LIDAR sensor 100 can also communicate with a processor 126. These components are interconnected as shown to sense the wind velocity at remote distances as will be explained herein. More particularly, the oscillator 102 drives the laser 104 in a conventional manner to produce pulses of laser energy. The laser energy is then coupled to the fiber switch 108 via the bi-directional coupler 106. The fiber switch 108 routes the laser energy to one of the four lenses 112, 114, 116, and 118 in a pre-selected pattern. Preferably, the fiber switch 108 rotates the laser energy between the lenses 112, 114, 116, and 118 on a periodic basis. As will be appreciated shortly, the fiber switch 108 maintains its position for a length of time after routing any particular pulse of laser energy pulse to its destination. As the laser energy 128, 130, 132, and 134 leaves the ports associated with each of the lenses 112, 114, 116, and 118 it propagates through the atmosphere thereby traveling away from the sensor 100 to remote locations where weather events may be occurring. Of course the weather may be quite calm along the path(s) of the laser energy. In any case, particles and aerosols entrained in the wind along the path of the laser energy causes a Doppler shift in the laser energy reflected therefrom. The amount of the Doppler shift is of course related to the component of the wind velocity that is parallel to the direction of travel of the laser energy.

Some of the Doppler shifted laser energy is of course reflected back toward the LIDAR sensor 100. The reflected energy re-enters the port associated with the lens 112, 114, 116, or 118 from which it was previously transmitted. Then the appropriate lens 112, 114, 116, or 118 couples the reflected energy back into the fiber optics assembly 110 and then to the fiber switch 108. As noted above, the fiber switch 110 temporarily holds its position after routing any particular laser pulse to one of the ports of the optics assembly 110. One of the reasons for the switch to hold its position is to allow time for the laser energy to be reflected back to the sensor 110 and routed back through the fiber switch 108 for subsequent detection. By timing the arrival of the reflected laser energy it is therefore possible to determine the distance to the measured wind velocity. Of course, the length of time during which the fiber switch 108 holds its position determines the maximum distance at which the wind velocity can be measured without introducing an ambiguity into the determination of the sensing distance (due to a return from a previous laser pulse arriving during the sensing period for the current laser pulse). Accordingly, increasing the duration (or gate) of the hold allows for detection of the wind velocity at more remote distances.

Once the reflected laser energy exits the fiber switch 108, the bi-directional coupling 106 routes the received reflected laser energy to the homodyne detector 120 via a photo detector 119. The photo detector 119 generates an electric signal that is representative of the reflected laser energy as frequency shifted by the particles entrained in the wind. By mixing the frequency shifted signal with the oscillator signal, the homodyne detector 120 extracts the change in frequency (and if desired the phase difference) between the transmitted laser energy and the reflected laser energy. The difference signal is then communicated to the amplifier/signal conditioner 122 and the analog to digital converter 124 for conversion to digital data that conveys the wind velocity. This data may be transmitted or otherwise communicated to a modeling node 46 (see FIG. 2).

Figures 4A, 4B:
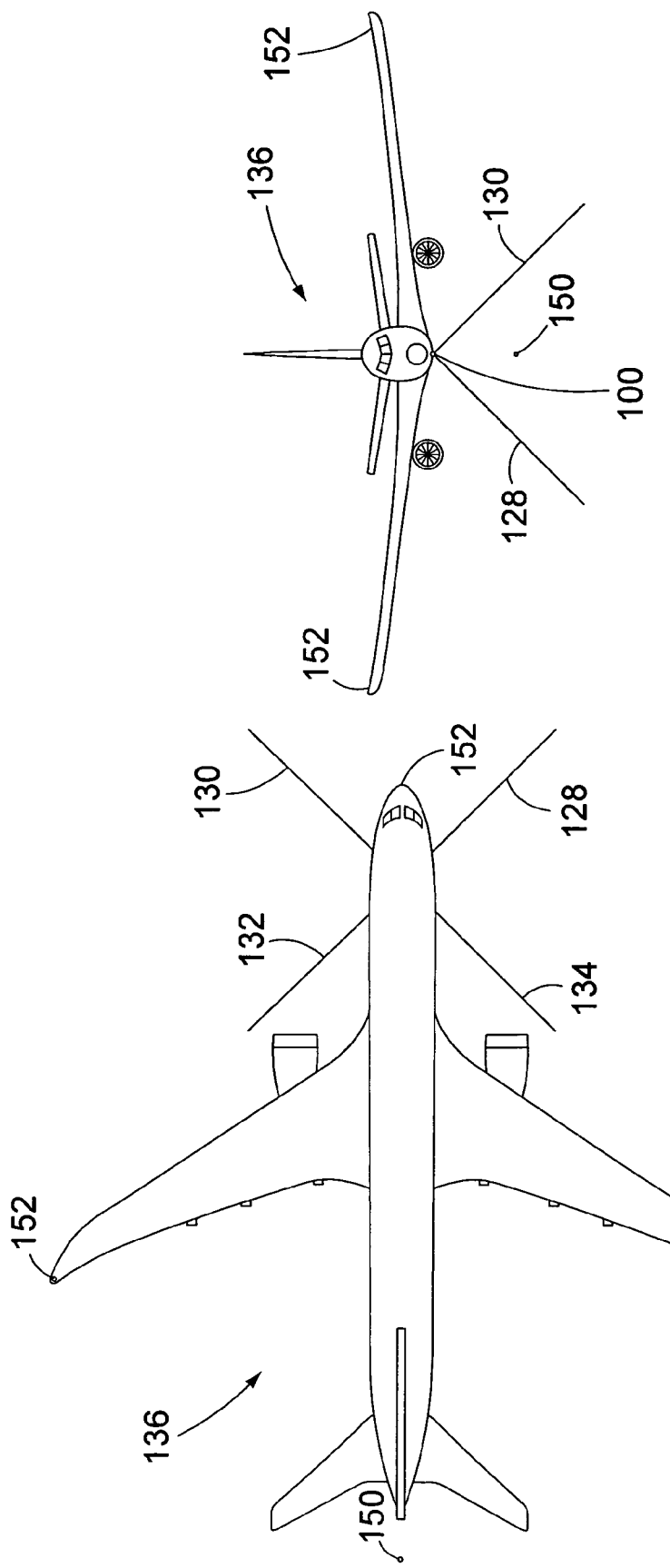
FIG. 4 illustrates the remote profiler of FIG. 3 installed on an aircraft.

In the embodiment shown in FIG. 4, the LIDAR sensor 100 (shown schematically at the apex of laser transmission paths 128 and 130) is configured to meet the environment onboard an aircraft 136 so that it can produce the four laser transmissions 128, 130, 132, and 134. These laser transmissions 128, 130, 132, and 134 are preferably aimed in pairs down and to the left and right of the aircraft 136 and in pairs down and to the fore and aft of the aircraft 136. In this manner a set of four orthogonal laser transmission paths 128, 130, 132, and 134 can be created along which the LIDAR sensor 100 can sense wind velocities. Since the LIDAR sensor 100 senses the Doppler shift of the reflected laser energy, each of the four laser transmissions 128, 130, 132, and 134 will only measure the wind velocity in a direction parallel to each of the laser transmission paths 128, 130, 132, and 134. However, together, the set of four laser transmission paths 128, 130, 132, 134 provides four measurements of wind velocity each having a known direction relative to the other measurements. Since the angles defining these four directions can be pre-selected, the four measurements can be trigonometrically combined to yield an accurate measurement of the wind velocity in the near far field of the aircraft 136. Preferably, the laser paths point at an angle of 45 degrees as measured from a horizontal plane and at angles 45 degrees from the heading of the aircraft 136. Of course, the wind measurement may be adjusted for the velocity of the aircraft 136 to yield a three-dimensional wind velocity measurement that is accurate to within about 1 meter/second. Even the wind velocity as measured along a single transmission path, at a any given location, can be useful in building a model by providing one component of the wind velocity at that location when no other data may be available. Thus, the model may be partially validated, or improved, with even a single component of the wind velocity. Additionally, the LIDAR sensor 100 can also be used to measure meteorological phenomenon other than wind velocity such as turbulence and particulate concentrations.

In an embodiment, the LIDAR sensor 100 of FIG. 3 is configured with an eye-safe laser 106 that operates at a wavelength between 1.5 to 2 micrometers. Further, the laser 106 is selected to produce a 40 milli-Joule, 600 nano-second pulse at a rate of 10 Hz. The apertures associated with the lenses 112, 114, 116, and 118 are about 4 by 8 centimeters across. Also, preferably, the LIDAR sensor 100 is able to detect meteorological phenomenon with a 100 meter resolution between adjacent measurement locations. Furthermore, the laser 106 and fiber switch 108 can be configured to pulse and change positions, respectively, at about 2.5 Hz. At a typical cruise velocity for the aircraft 136 this timing causes the samples to be spaced apart by about 100 meters in parallel with the vehicle's flight path. Further, it is estimated that the LIDAR sensor 100 of the current embodiment could fit within an envelope of about 20 cm by 20 cm by 20 cm and weigh about 5 kg. In addition to sensing wind velocities, the LIDAR sensor 100 can also be used to detect turbulence and particulate concentrations also.

Referring again to FIG. 4, another embodiment of the present disclosure is illustrated. FIG. 4 schematically shows a nano scaled meteorological sonde 150 dropping away from (and just behind) the aircraft 136 and three associated transceivers 152 that are located onboard the aircraft 136. Typically, these nano-sondes 150 can include MEMS (Micro Electro Mechanical Systems) pressure, temperature, and humidity sensors or even optical sensors for measuring such quantities as insolation, cloud cover, or particulate concentrations and compositions. Regardless of the type of sensor (s) that are incorporated on the nano-sonde 150, the aircraft 136 can periodically drop the nano-sondes 150 to measure the profile of an atmospheric property as the nano-sonde(s) falls from the aircraft 136. Furthermore, the nano-sondes 150 can be fabricated using high-volume MEMS sensor technology and can incorporate relatively cheap communications technology (e.g., cellular phone or Bluetooth transceivers) to enable them to transmit the data that they collect. Thus, a large number of nano-sondes 150 to be stored on, and deployed from, the aircraft 136.

Preferably, these expendable nano-sondes 150 are packaged to weigh about 1 gram each and have a coefficient of drag that rapidly dissipates the horizontal component of their velocity after they are released from the aircraft 136. Acting under the influence of gravity, the nano-sondes 150 then reaches terminal velocity and transmits weather data to the aircraft transceivers 152. Preferably, the nano-sondes 150 are configured to transmit the weather data that they gather at intervals of about 100 meters of altitude using active RF (radio frequency) technology.

While the nano-sondes 150 could include a tracking subsystem, it is preferred that the tracking of the nano-sondes 150 be accomplished from onboard the aircraft 136. Aircraft based tracking allows the wind velocity being experienced by a nano-sonde to be measured in part by detecting the cross range motion of the nano-sonde. Active measurement of the range between the aircraft and the nano-sonde allows the in-track wind velocity to be measured with conventional RADAR systems located on the aircraft (and incorporated into the transceivers 152 if desired). Such aircraft based tracking systems can be augmented by fabricating the antenna of the nano-sonde 150 to resonate at the RADAR frequency used by the onboard transceivers 152. The resonating antennas allow the nano-sondes 150 to possess a large RADAR cross section for convenient detection and tracking by the transceivers 152 or other RADAR systems. Thus, in at least this manner, the nano-sondes 150 allow remote detection of the various meteorological conditions which they can be configured to detect.

Also, the nano-sonde 150 dispensing system on the aircraft can be configured to adapt to local conditions or user commands. Such an intelligent dispensing system could vary the drop spacing of the nano-sondes 150 to maximize the gathered data where the weather is active (e.g., near a storm) while saving cost (i.e., conserving nano-sondes) where the weather is quieter. Additionally, the dispensing system can be configured to receive remote programming while in-flight (via the aircraft 136 communication systems or otherwise) to, among other things, allow a centralized system to coordinate nano-sonde 150 coverage among multiple aircraft 136.

Figures 5A, 5B:
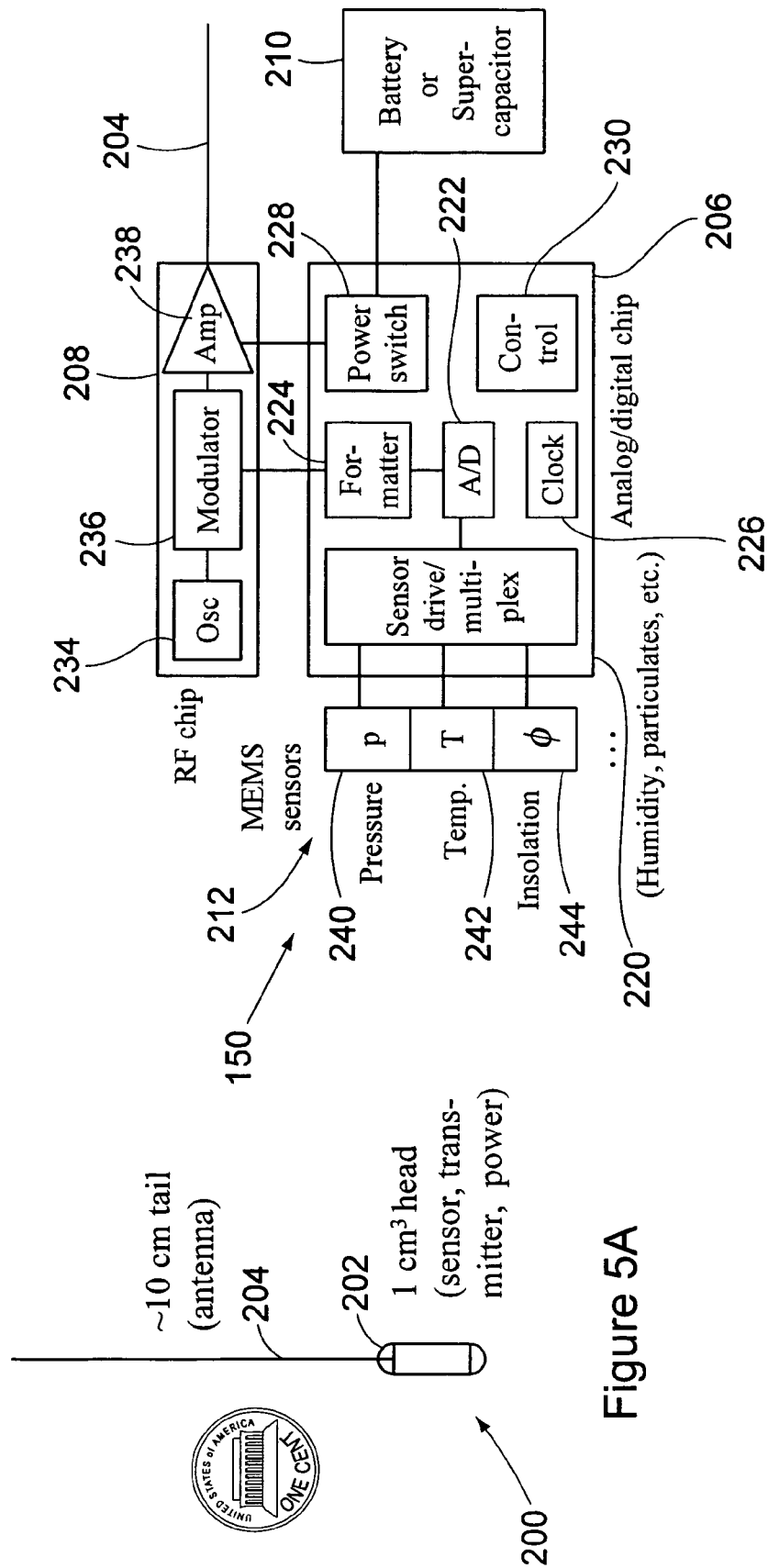
FIG. 5 illustrates another remote profiler constructed in accordance with the principles of the present disclosure.

FIG. 5A illustrates one embodiment of a nano-sonde. Generally, the nano-sonde 150 includes a head or body 202 and an antenna 204. Together, the head 202 and antenna 204 can be about the size of a penny as shown or smaller. In an embodiment, though, the head encloses a volume of about 1 cubic centimeter and is coupled to a 10 centimeter long antenna. FIG. 5B further illustrates the nano-sonde 150 in schematic form. The nano-sonde 150 shown is subdivided into a signal conditioning portion 206, a transceiver portion 208, a power supply 210, and a sensor package 212. Further, the signal conditioning portion 206 includes a set of sensor drivers and a multiplexer 220, an analog to digital converter 222, a data formatter 224, and supporting functions such as a clock 226, a power distribution circuit 228, and a controller or programmable circuit 230. The transceiver 208 includes an oscillator 234, a modulator 236, and an amplifier 238 connected generally in parallel with the antenna 204. The power supply 210 is preferably a battery or capacitor with a capacity sized to allow the nano-sonde 150 to gather and transmit weather related data for its descent through the atmosphere. It is estimated that a 1-2 Joule capacity can be stored in a 1-2 milligram battery and should be sufficient to allow data gathering for the entire descent from typical commercial cruising altitudes. The sensor package 212 shown includes a pressure sensor 240, a temperature sensor 242, and an insolation sensor 244 although many other types of sensors (e.g., humidity and particulate sensors) could be incorporated on the nano-sonde 150. These components are interconnected as shown in FIG. 5B.

In operation, the nano-sonde 150 detects meteorological conditions via the sensor package 212, conditions the raw signal(s) from the sensor package 212 via the signal conditioning portion 206, and transmits the resulting data via the transceiver section 208. More particularly, the sensors 240, 242, and 244 transduce the weather phenomenon to a signal which is communicated to the sensor driver(s) 220. The drivers 220 condition the raw signals to generate, preferentially, linearly proportional signals that represent the sensed conditions. From there, the analog to digital converter 222 sends a digital representation of the conditioned signals to the formatter 224 which performs any desired formatting, encoding, etc of the digital signals. For instance, the formatter 224 can assemble the gathered data into a relatively compact 64 bit message that, even at low power levels (e.g. less than 10 milliwatt average power and 1 watt peak power for easy detection), should take only a few milliseconds to transmit. Assuming that any one nano-sonde 150 is configured to transmit every 1-2 seconds, the timing allows dozens of nan-sondes to be dropped and transmit to a particular aircraft 136 at any given time. The formatted signals are then sent to the modulator 236 and mixed with the carrier (which is preferably in the range of 1.5-3.0 GHz) from the oscillator 234 for broadcast via the amplifier 238 and antenna 204. Subsequently, the transmitted signal from the antenna 204 is received by the transceivers 152 on the aircraft 136 (see FIG. 4). In the meantime, the controller coordinates the various operations. For example, the controller can detect the altitude of the nano-sonde 150 via the pressure sensor 240 and trigger samples of the sensed conditions at appropriate altitudes or upon the satisfaction of other pre-selected conditions.

Because the nano-sondes can be small and made from conventional MEMS materials, they represent no impact hazard to aircraft or objects (or people) on the ground. Also, the nano-sondes can be non toxic and, accordingly, represent no ingestion hazard for wildlife. Thus, dispensing the nano-sondes should have no adverse environmental impacts. Additionally, since the nano-sounds have fewer parts than a typical digital watch, the nano-sondes are estimated to cost only a few cents a piece. Given that there are approximately 500,000 kilometers of commercial air routes and assuming that each route is sampled with nano-sondes every 2 hours, the cost of providing the additional weather data is estimated to amount to about $10M year which is less than one third as much as the National Weather Service of the United States spends each year on balloon-borne radiosondes. Since many times this amount could be saved by increasing the accuracy of weather forecasts, the cost of sampling the air routes with nano-sondes is economically feasible.

Figure 6A:
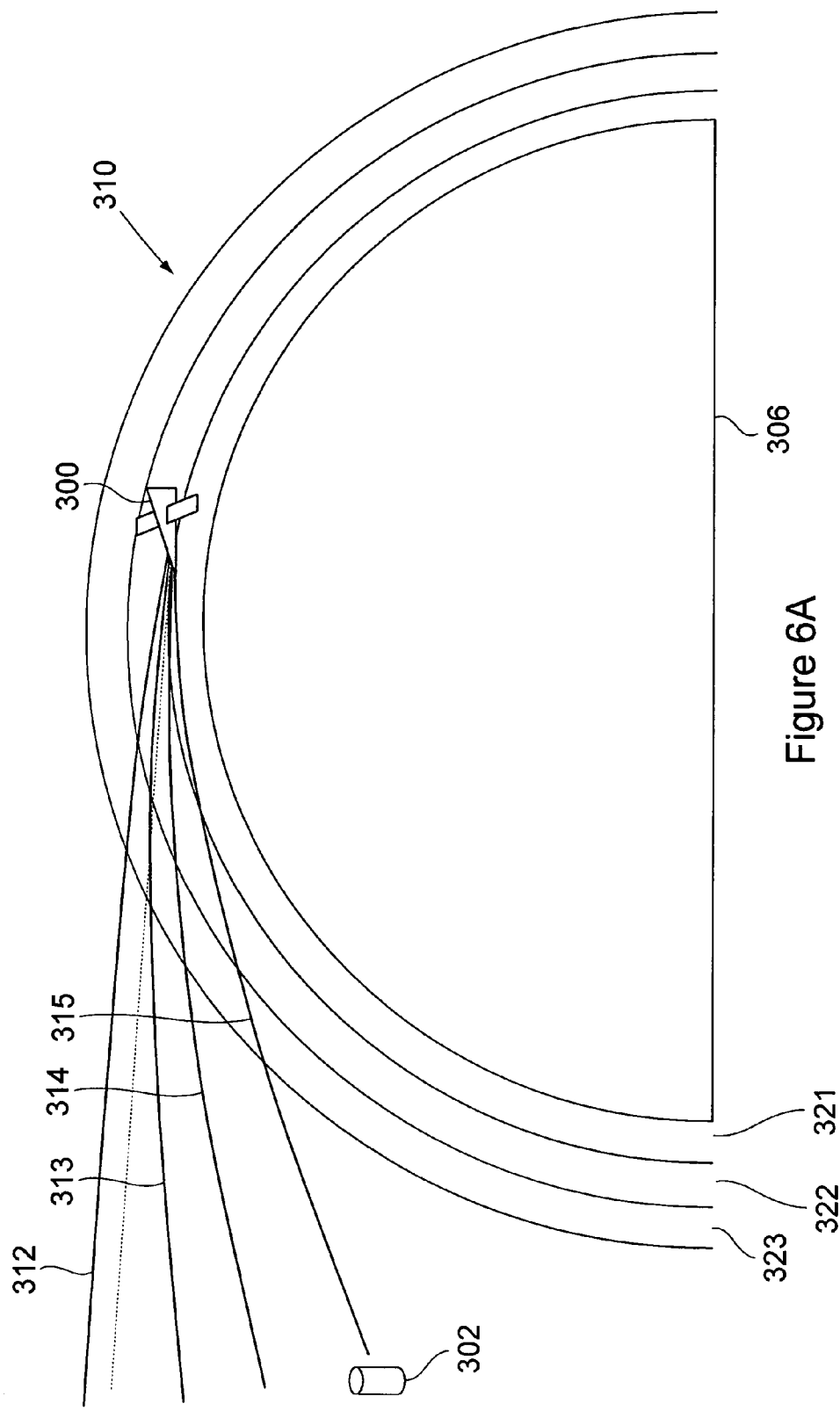
FIG. 6 illustrates yet another remote profiler constructed in accordance with the principles of the present disclosure.

Now turning to FIG. 6A, another remote profiler that is constructed in accordance with the principles of the present disclosure is illustrated. The remote profiler 300 shown in FIG. 6A senses weather remotely via the occultation of a GPS signal caused by its transit through the atmosphere. The sensor 300 is shown schematically along with a satellite 302 positioned over the Earth 306. The atmosphere 310, four signal paths 312-315, and three layers 321, 322, and 323 of the atmosphere 310 are also shown schematically in FIG. 6. In the current embodiment, the satellite 302 transmits positioning signals to the sensor 300 along the paths 312-315. The signal paths 312-315 are shown as relatively straight although the passage of the signals through the atmosphere 310 actually refracts (and therefore bends) the signal paths 312-315. According to Aoyama et al, the curvature of the signal paths 312-315 is due to the signal's refraction in the atmosphere 310 in accordance with the equation:

$$(n-1) \times 10^6 = k_1 P/T + k_2 e/T^2$$

where n is the index of refraction, T is the air temperature, P is the air pressure, e is the water vapor pressure (i.e. a measure of humidity), and $a_1$ and $a_2$ are constants. See "Mountaintop GPS observations: Downward looking GPS occultation measurement on the top of Mt. Fuji," Yuichi Aoyama, Y. Shoji, T. Yoshihara, S. Danno, and T. Tsuda, Colloquium presentation at Atmospheric Remote Sensing Using the Global Positioning System, Boulder, Colo., 20 Jun.-2 Jul. 2004. Thus, depending on the temperature, pressure, and humidity along a particular signal path 312-315 the signal will be refracted by a certain amount. Furthermore, because the signal paths 312-315 sweep through the different layers 321, 322, and 323 of the atmosphere 310, and over different regions of the Earth the index of refraction will change accordingly. As a result, the index of refraction of the signal as received by the sensor 300 will fluctuate over time.

With regard to the occultation of signals in general, an observation is a set of measurements taken as the receiver or viewer (e.g., a satellite) views an infinitely distant source of electromagnetic radiation such as a star. If the radiation passes through the atmosphere 310, the passage affects the electromagnetic signal in one or more ways, e.g. attenuation or delay. Passage through denser layers (e.g, layer 321) of the atmosphere 310 affects the radiation more strongly, and a longer distance traveled through any layer 321, 322, or 323 of a given density, pressure, and temperature (for simplicity "density" will be used hereinafter as a surrogate for these conditions) affects the radiation more strongly.

Figure 6B:
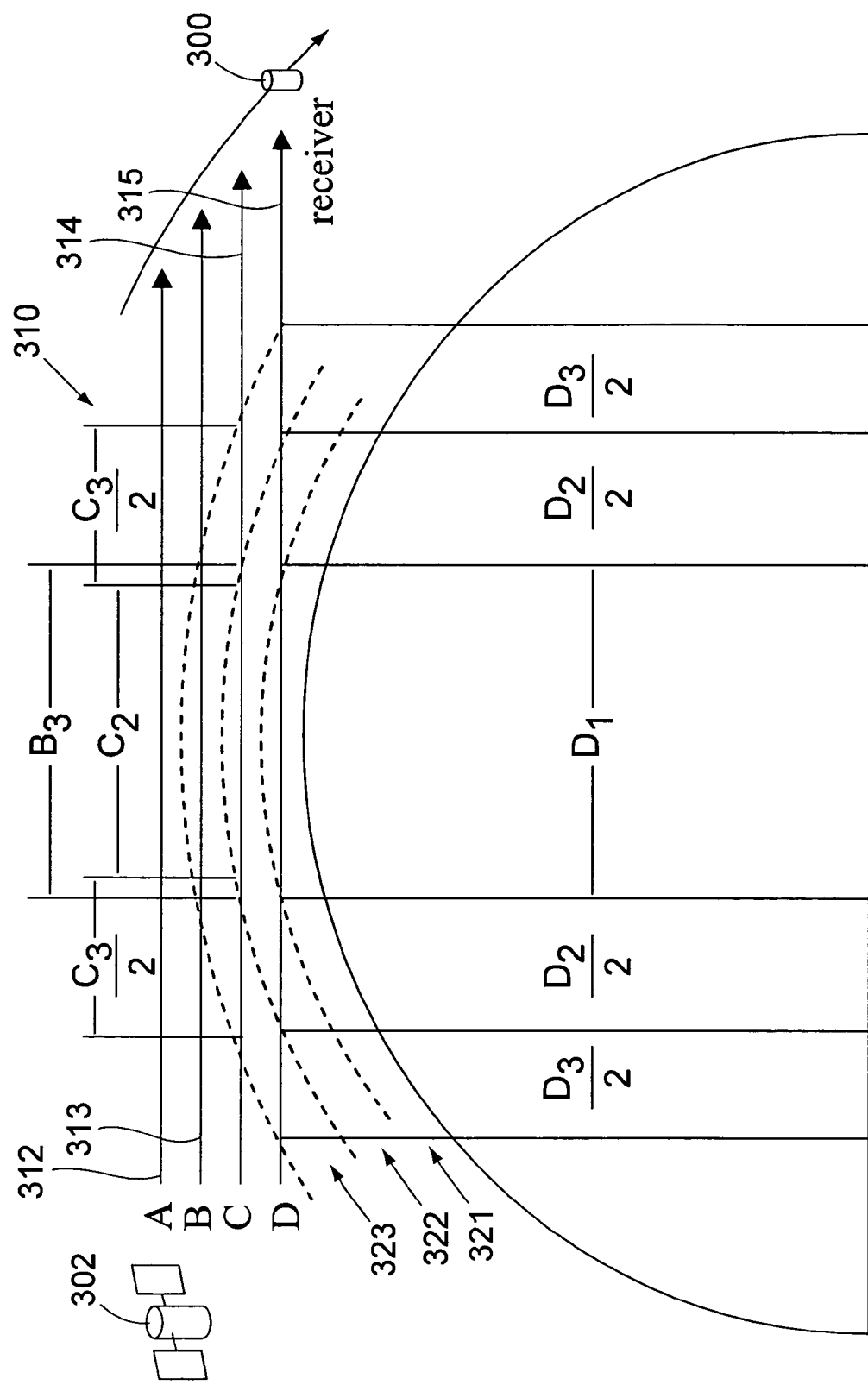

FIG. 6B shows a simplified GPS occultation system wherein one sensor 300 is space borne such that some of signal paths such as the path 321 from a satellite 302 to the sensor 300 does not traverse the atmosphere to any significant extent. Other signal paths such as path 313 goes only through the uppermost layer 323 of the atmosphere 310. Other signal paths such as path 314 goes first through layer 323, then layer 322, and back out of the atmosphere 310 through layer 323. Still other signal paths such as path 315 traverse essentially all layers 321-323 of the atmosphere 310. It is possible to calculate how much each of the layers 321-323 affects each signal paths 312-315 by considering FIG. 6. The distance path 313 travels through layer 323 is distance B3. The distance path 314 travels through layer 322 is C2; the distance path 315 travels through layer 323 is one half of the distance C3 on the way into the atmosphere 310 and another one half of the distance C3 on the way out of the atmosphere 310, for a total distance of C3. Path 315 travels through layers 321-323 a distance of D1, D2, and D3, respectively. Assuming that each of the layers 321-323 has a generally spherical shape, these distances can be computer by relatively simple geometry. We can write the distances as a matrix M where $$M = \begin{matrix} A1 & A2 & A3 \\ B1 & B2 & B3 \\ C1 & C2 & C3 \\ D1 & D2 & D3 \end{matrix}$$

If the density $\rho$ of layer i is $\rho_i$, we can indicate the densities of all layers as the vector $\rho = \{\rho_1, \rho_2, \rho_3\}$. The measurements of some quantity q such as path delay along the four paths can be indicated as a vector $Q = \{q_A, q_B, q_C, q_D\}$. We can then predict the measurements Q from the densities p and the distances traveled M by $$Q = \rho^T M \quad (2)$$

where T indicates matrix transposition. This equation is a compact way of writing $$q_{312} = \rho_1 A_1 + \rho_2 A_2 + \rho_3 A_3$$

$$q_{313} = \rho_1 B_1 + \rho_2 B_2 + \rho_3 B_3$$

$$q_{314} = \rho_1 C_1 + \rho_2 C_2 + \rho_3 C_3$$

$$q_{315} = \rho_1 D_1 + \rho_2 D_2 + \rho_3 D_3$$

Conversely, given the measurements Q and, by geometry, the distances M, we can compute the densities $\rho$ as $$\rho = Q^T M. \quad (3)$$

This method is similar to a tomography algorithm called algebraic reconstruction. Where the measurements Q are stellar brightness and the densities $\rho$ are attenuation coefficients, we have a standard limb occultation measurement. Astronomers used this to estimate the atmospheric density profiles of Mars, Jupiter, and other planets before spacecraft visited those places.

For remote weather sensing via GPS occultation the Q values are signal path delays, the p values are refractivities, and M is the signal paths through the atmosphere. The distance matrix M can account for the motion of the source (e.g., the GOS satellite 304 of FIG. 6) and the sensor 300. M may also account for the increase in the signal paths 312-315 due to the curvature of the paths that refraction causes. Adjusting M for the motion of the vehicles is an exercise in kinematics. Where the sensor 300 is in the atmosphere, such as is shown in FIG. 6A, the path lengths can also be adjusted to account for the signal path stopping in the atmosphere 310 rather than continuing through and out of the atmosphere as in FIG. 6B. Accounting for the refraction can be accomplished by iteration as follows. An a priori estimate of the atmospheric conditions is made so that the paths can be estimated. After we solve equation $\rho$ values once, we use the estimated refractivity values in $\rho$ to update the estimated paths, which modifies the distances in M. $\rho$ is then solved again and M is updated until the process converges. In an embodiment, the density is assumed to be spherically symmetric about the center of the Earth, at least within the region of interest. Thus, it is not necessary to estimate lateral variations in $\rho$ although accounting for lateral variations in $\rho$ is within the scope of the present disclosure. In any case, when the process converges, a good estimate of $\rho$ is produced which is a vertical profile of the refractivity of the atmosphere 310.

One method to obtain the three variables P, T, and e from the single variable n is called one dimensional variational analysis (hereinafter "1D-var"). 1D-var uses known physical and statistical laws governing the three variables, and it includes use of a priori knowledge such as measurements of P or T at nearby locations. For instance Aoyama et al uses a cost function $$J(x) = \tfrac{1}{2}(x-x_b)^T B^{-1}(x-x_b) + \tfrac{1}{2}(Hx-y_0)^T R^{-1}(Hx-y_0)$$

where x, $x_b$, B, $y_0$, R are vectors or matrices, x is the vector of P, T, and e at all altitudes to be measured, $x_b$ is the a priori estimate of x, y0 is the set of occultation measurements (typically phase shifts) along all paths 312-315, and H is a forward model that predicts the measurements y given a value of x. From these definitions, the factor (Hx-y0) is the difference between the model-predicted values of y and the observed values of y, and the factor (x-xb) is the difference between a given value of x and the a priori value of x (which may be an estimate based on other measurements.) Then B is a matrix of costs for each difference between an a priori estimate and the new estimate for P, T, or e at each altitude. Similarly, R is a matrix of costs for each difference between a) an actual occultation measurement y along each path and b) the measurement predicted by the model H, given an estimate of P, T, and e at each altitude.

Figure 7A:
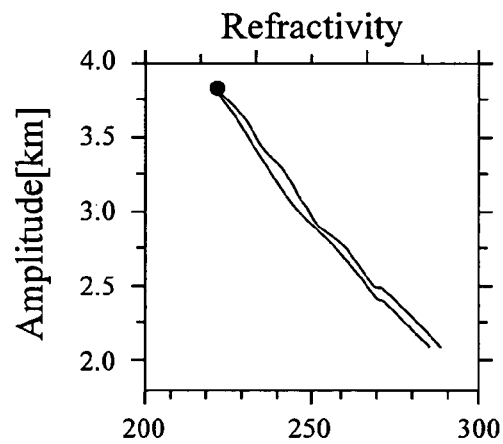
FIG. 7 illustrates the data gathered by the remote profiler of FIG. 6.
Figures 7B, 7C, 7D:
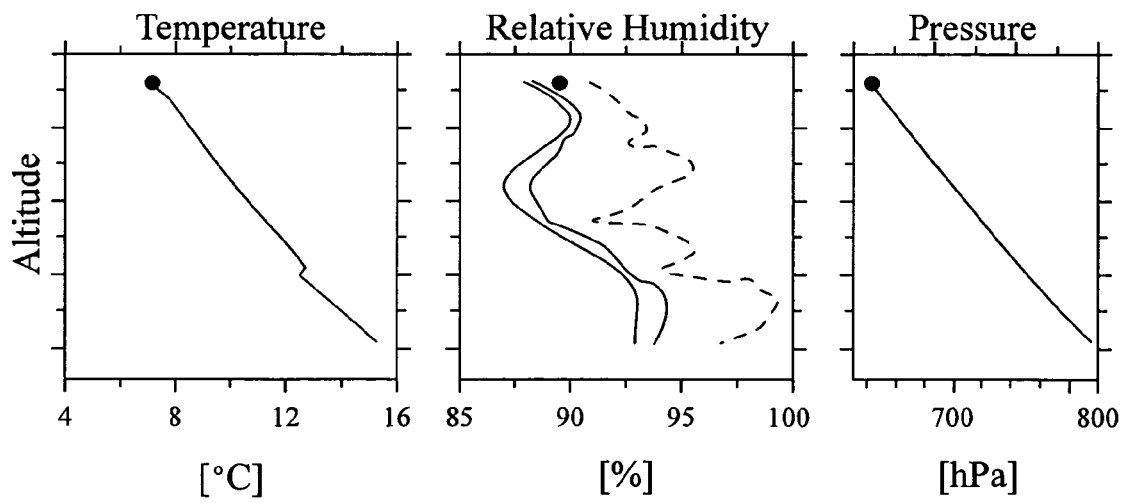

Aoyama et al use knowledge about the precision and reliability of each measurement $y_0$ and each a priori estimate $x_b$ to determine the values in cost matrices B and R. Since some $x_b$ estimates may come from precise, reliable instruments or well-established laws, the cost of disagreement with these particular $x_b$ values is high. Other $x_b$ estimates may be wild guesses, so the cost of disagreement with them is low. Aoyama varies the values of x to minimize the cost function, J(x). The minimum-cost x contains the most likely values of P, T, and e at each altitude. FIG. 7A shows the results obtained by Aoyama for the refractivity of the atmosphere verse the altitude. Further, FIG. 7A is an estimate of the x vector (where x is only refractivity, not P, T, and e) from actual measurements by Aoyama et al in the summer of 2001. FIGS. 7B, 7C, and 7D show, respectively, the vertical profiles of the temperature, relative humidity, and pressure obtained by Aoyama from the refractivity results of FIG. 7A.

In one embodiment, the GPS transmitters used to generate these signals are located on ships or aircraft with the GPS receivers located on aircraft. Additionally, it is possible to create a GPS like system that operates at frequencies (preferably either in the radio or optical range) that are highly sensitive to atmospheric conditions. These frequencies are preferred, in part, because the GPS system frequencies were chosen to be relatively unaffected by atmospheric conditions. Of course, as disclosed in U.S. patent application Ser. No. 11/003,868 filed on Dec. 3, 2004 by Tillotson and entitled System For Measuring Turbulence Remotely which is incorporated herein as if set forth in full, it is also possible to sense turbulence remotely using GPS signal scintillation even with signals using the GPS frequency bands. Furthermore, as set forth therein, it is also possible to build a tomographic model of the remotely sensed turbulence.

In addition to the remote profilers previously discussed, many other sensors can be included in the system shown in FIG. 1 or the network shown in FIG. 2. For instance, an additional type of remote profiler can be created by modifying an airborne weather radar unit to scan below and above the flight path of the aircraft on which it is mounted. Similarly, new remote profilers can be created by modifying airborne weather radars to detect the Doppler shifts caused by the wind and windborne particles, aerosols, precipitation, and the like. The weather information derived therefrom can then be input into a weather model. For another example, the weather radar systems onboard many commercial (and military) aircraft can be used to capture images of storms, turbulence, and other meteorological phenomenon. Instead of merely categorizing the precipitation or turbulence into one of a few categories of severity, the resolution of the weather radar systems can also be increased to provide a more precise measure of the magnitude of the sensed phenomenon. The resulting images can then be transmitted to a meteorological model (along with the location of the relevant sensing node and the relative location of the storm) and used as inputs to the model. Moreover, bi-static radar can be used in conjunction with the systems and networks provided by the present disclosure. For instance, a radar transmitter can be placed on a satellite and used to illuminate a portion of the atmosphere with radar energy. Radar receivers mounted on aircraft or other mobile platforms can receive the radar signals as they are reflected from meteorological phenomenon. Again, the data derived from these sensors (or remote profilers) can then be communicated to a modeling node for inclusion in a weather model.

In an alternative embodiment, a GPS receiver is modified to detect the signal delays and phase changes associated with the reflection of a GPS signal from the surface of a body of water (e.g., the ocean). The returns from the surface features (e.g., waves) can reveal information regarding the winds in the vicinity. This result occurs because as waves develop over the body of water, the distribution of signal delays in the reflected signal increases. Therefore it is possible to correlate wave size (i.e., the wave amplitude), the distance between waves (i.e., the wave length), and wave direction with the signal delay distribution in the reflected signal. Since these parameters can be correlated with the wind velocity it is possible to remotely sense the wind velocity over the body of water using this technique of "GPS reflectometry." For more information regarding GPS reflectometry, the reader is referred to "The Application of Reflected GPS Signals to Ocean Remote Sensing," Garrison, James L., Katzberg, Stephen J., Remote Sens. Environ. 73:175-187 (2000) which is incorporated by reference as if set forth in full herein. Of course, GPS reflectometry can also be used to measure soil moisture as reported in Masters, D., Zavorotny, V., Katzberg, S., Emery, W., (2000), GPS Signal Scattering from Land for Moisture Content Determination, Presented at IGARSS, Jul. 24-28, 2000 which is incorporated as set forth in full herein. Likewise, transmissions other than GPS signals can be used to characterize surface features such as waves. For instance, the airborne weather radars that are found on many commercial aircraft can be modified to function in conjunction with a computer that analyzes the returns from the surface. Microwave sounders can also be installed on commercial aircraft and used to remotely sense atmospheric temperature, water content, precipitation, and even pressure. Likewise, a microwave imager can be used to measure these properties and soil moisture and wind velocity over a wider area. Meanwhile, a passive infrared sensor may be used to measure atmospheric temperature and water content.

Thus, the exemplary sensors that can be used in the systems and networks provided by the present disclosure include wind LIDAR, onboard radar modified to provide improved turbulence measurements, onboard radar modified to sense Doppler shifts induced by weather conditions, space based bistatic radar, GPS occultation sensors, GPS reflectometry sensors, passive microwave sounders, passive microwave imagers, expendables (e.g. nano-sondes), ship-to-air occultation sensors, air-to-air beacon detectors, and passive infrared sensors. The sensors actually chosen will usually depend on the needs of the customer or end user of the model. In addition to the properties that the user wishes to measure, the impact of the sensor on the vehicle and on the vehicle's integrated systems should also be considered.

Figure 8:
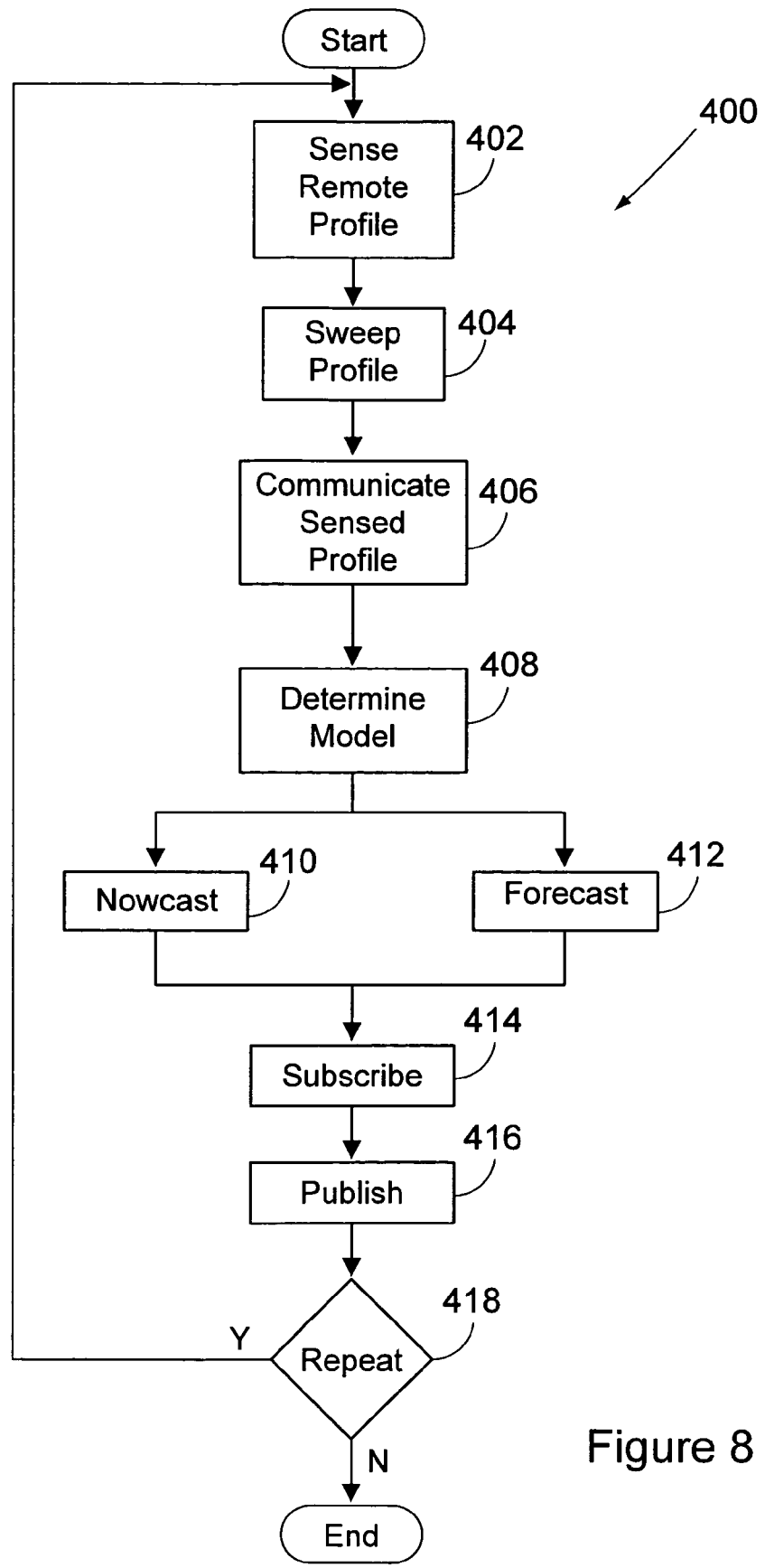
FIG. 8 illustrates a method in accordance with the principles of the present disclosure.

With reference now to FIG. 8, a method 400 in accordance with the principles of the present disclosure is illustrated. The method 400 includes remotely sensing profiles of atmospheric properties as in operation 402. These profiles may be measured by sweeping the measurement through the atmosphere particularly if the profilers are located on aircraft or other mobile platforms. Thus, as in operation 404 the measurements of the profiles are taken along curvilinear surfaces (see FIG. 1). These profiles can then be communicated to a processor for inclusion in a meteorological model. See operation 408. Depending on the desires of the end user, a nowcast or forecast of the weather may be determined in, respectively, operations 410 and 412. If the modeling device and the end users communicate through a publish-subscribe architecture, the nowcast and forecast may be subscribed to (and published) in operation 414 (and 416). As more data becomes available, or as other conditions warrant, the method 400 illustrated in FIG. 8 may be repeated as indicated at operation 418.

In view of the foregoing, it will be seen that the several advantages of the disclosure are achieved and attained. More particularly, it has been shown that the present disclosure dramatically increases the volume of data available for creating weather models. The increase in available data also, of course, improves the accuracy and reliability of these weather models. In turn, the improved weather models provided by the present disclosure increase the safety, comfort, and reliability of air travel (in particular). Similarly, the present disclosure also expands the airspace through which aircraft can fly at any given moment because the present disclosure allows accurately nowcasting and forecasting the weather over a greater territory. Such improvements enable the flexibility necessary to implement the "Free Flight" program of the Federal Aviation Administration of the United States.

The present disclosure will also save the aviation industry significant amounts of money. According to the Air transportation Association, U.S. airlines consumed 18.7 billion gallons of jet fuel in 2004 (13.7 billion gallons domestically and 5.01 billion gallons internationally), for which they paid an average of $1.15 per gallon. If global wind profiles had been available to enable the pilots to fly more efficient routes, the estimated fuel reduction for domestic flights would have been about 0.5% and for international flights would have been about 1.0%. Thus the likely savings would have been on the order of $130M/year or, perhaps greater. For more information see Cordes, J. J. and A. Flanagan, 1995: Economic Benefits and Costs of Developing and Deploying a Space-based Wind Lidar, Final Report, NWS Contract No. 43AANW400223. George Washington University.

Additionally, better prediction of disruptive events would allow airlines to take preemptive action (e.g., anticipate a snowstorm, cancel flights, or move aircraft to unaffected airports where they can be used for other flights). These disruptive events increase airline costs by causing a need for additional fuel, crew time, and maintenance. Airline costs also increase due to disruptive events because the airlines pay additional amounts for passenger meals, lodging, and alternative flights. Moreover, the airlines lose revenue and suffer the ill will of passengers dues to flights canceled by these disruptive events. Thus, according to the Mitre Corporation, in a single year, US airlines can incur disruption costs of $1.8 billion.

The Air Traffic Organization of the U.S. Federal Aviation Administration estimates that weather delays cost $2.2B (excluding passenger time) with thunderstorms causing about 40% of all Weather Delay Costs (approximately $880M). If it is assumed that 40% of the thunderstorm disruptions could be avoided, or mitigated, due to the improved weather forecasts enabled by the present disclosure, $352M in avoidable costs could be saved. One study by The Boeing Company showed that modest improvements in accordance with the principles of the present disclosure in weather forecasts could provide a 5% improvement in airline schedule effectiveness as measured by the effective seat miles of the airline.

More specific examples also illustrate some of the benefits provided by the present disclosure. For instance, improved prediction of convective weather at Newark Airport alone could save $2 million during a single convective weather event. Over one year in the New York area, improved convective weather predictions could reduce delays by 49,000 hours (primary delay reductions of 27,000 hours and downstream passenger savings of 22,000 hours). These effects have a monetary value of over $150 million. In addition, savings of $480,000 per event could be achieved with better prediction of low ceilings and high winds according to a study by the Massachusetts Institute of Technology.

While the aviation system is a likely beneficiary of more accurate prediction services, other industries also have the potential of benefiting from the information services provided by the present disclosure. For instance, the maritime, broadcast media, energy, agriculture, construction, insurance, and other industries could benefit from the advantages provided by the present disclosure not to mention the government, secondary markets, and other public sectors.

For instance, simulations indicate that accurate global wind predictions could improve hurricane prediction by 17% (e.g., a 29 hour forecast based on data provided by the present disclosure would be as accurate as a current 24 hour forecast). Such an improvement would reduce preventable losses from hurricanes by 2%-3%. Given that average losses in this area equal about $1.2 billion per year, the present disclosure could yield potential economic benefits on the order of $24 to $36 million per year in preventable property damage (plus likely reductions in loss of life and injuries). Furthermore, the cost of undertaking unnecessary preventative actions is approximately $32 million for a typical hurricane. According to a study by the National Oceanic and Atmospheric Agency (N.O.A.A.), if it is assumed that a 17% savings occurs for two land falling hurricanes per year the resulting potential annual savings is about $11 million.

Positive environmental effects will also arise from the practice of the present disclosure. Up to the minute response information on currents and winds that can now be provided will improve the effectiveness of deploying oil spill containment and cleanup efforts. It is estimated by N.O.A.A. that even a one percent increase in the efficiency of oil spill cleanup would have saved $100 million in the US over the last 10 years. For another example, Natural Resource Damage Assessment, Inc. estimates that preventing one major oil spill could save $3 billion. Since unforeseen weather events can contribute to some oil spills, improving weather forecasts in accordance with the present disclosure will repeat environmental benefits.

Further still, according to NOAA, the general public will benefit from the practice of the present disclosure. Since weather forecasts are generally not traded in traditional markets (with the exception of some highly specialized forecasts), it is difficult to value an improvements to weather forecasts. Analysis by N.O.A.A., however, has indicated that most consumers value improving the accuracy of one day weather forecasts. Surveys indicate that in the US alone, households value improved weather forecasts at $16 per year, yielding a U.S. total of $1.73 billion. This figure does not include business users (agriculture, transportation, construction, etc.).

Utilities will also reap benefits from the improved weather forecasts made possible by the present disclosure. Improved short-term weather forecasts will allow power generation savings of $69 million per year. A mere one degree improvement in temperature forecast accuracy alone would save $35 million per year according to NOAA. For the Tennessee Valley Authority alone, which generates 4.8% of the electricity produced in the U.S., a one degree improvement in forecast could save $100,000 per day according to U.S.A. Today.

Of course, other weather forecast end users such as the maritime industries (e.g., commercial shipping, fishing, cruise ships, tourism, and pleasure craft operators) could reap the benefits of improved weather forecasts due to the present disclosure. More particularly, the world fleet of commercial ships has over 33,000 ocean transits per year.

The weather data expected from an improved weather satellite, the National Polar-orbiting Operational Environmental Satellite System (NPOESS), is expected to save these shippers about $95 million per year according to the Marine Policy Center of the Woods Hole Oceanographic Institute. Thus, significant public benefits will be realized from the improved weather predictions made possible by the present disclosure.

The embodiments were chosen and described in order to best explain the principles of the disclosure and its practical application to thereby enable others skilled in the art to best utilize the disclosure in various embodiments and with various modifications as are suited to the particular use contemplated.

As various modifications could be made in the constructions and methods herein described and illustrated without departing from the scope of the disclosure, it is intended that all matter contained in the foregoing description or shown in the accompanying drawings shall be interpreted as illustrative rather than limiting. For example, the images of storms can be captured from radar systems onboard aircraft that are relatively near a storm. These images can then be fed to the modeling node and incorporated into the model. This aspect of the current disclosure is useful for weather sensing in regions where NEXRAD radar do not have coverage (e.g., over the oceans or near mountains). Thus, the breadth and scope of the present disclosure should not be limited by any of the exemplary embodiments, but should be defined in accordance with the claims and their equivalents.

What is claimed is:

1. A network comprising:
    a plurality of independent mobile sensing nodes each including a profiler, each said profiler adapted to sense a profile of an atmospheric property over a swept arc portion of the atmosphere;
    a network for interfacing the sensing nodes with an operator; and
    a modeling node including a processor, the processor in communication with the profiler to receive data from the profiler regarding the sensed profile, the processor being adapted to determine a model of the weather from the sensed profiles and to communicate the sensed profiles to the operator via said network.

2. The network of claim 1, wherein the network comprises an airborne wide area network, the processor being further adapted to communicate the model over the airborne wide area network.

3. The network of claim 2 further comprising a publish-subscribe architecture.

4. The network of claim 1, wherein the processor is further adapted to determine a forecast of the weather.

5. The network of claim 1, wherein the mobile sensing node is a first mobile sensing node, the profiler is a first profiler, and the profile being a first profile, the network further comprising a second mobile sensing node including a second profiler to sense a second profile of an atmospheric property, the processor in communication with the second profiler to receive data from the second profiler regarding the second profile, the processor being further adapted to determine the model of the weather from the second profile.

6. The network of claim 5 wherein the first and the second mobile sensing nodes are moving relative to the Earth.

7. The network of claim 6 wherein the swept first and second profiles intersect.

8. The network of claim 1 wherein the mobile sensing node is over a remote area.

9. The network of claim 1 wherein the modeling node is the mobile sensing node.

10. The network of claim 1 wherein the mobile sensing node further comprises an aircraft.

11. A method comprising:
    sensing a plurality of profiles of an atmosphere, the sensing being performed from a plurality of sensing nodes, with one of said sensing nodes forming a mobile sensing node;
    communicating the sensed profile to a modeling node;
    determining a model of the weather using the sensed profiles, the determining of the model being by a processor of the modeling node; and
    using a network in communication with said modeling node to communicate the model to a user.

12. The method of claim 11, wherein using a network to communicate the model comprises communicating over an airborne wide area network.

13. The method of claim 12 further comprising using a publish-subscribe architecture to communicate the model over the airborne wide area network.

14. The method of claim 11, further comprising determining a forecast of the atmospheric property.

15. The method of claim 11 wherein the mobile sensing node is a first mobile sensing node, one of the profiles is a first profiler, and the profiles being a first profile, the method further comprising sensing a second profile of the atmospheric property, the sensing of the second profile being from a second mobile sensing node, the method further including communicating the second sensed profile to the modeling node and further determining the model using the second sensed profile.

16. The method of claim 11 further comprising operating the mobile sensing node over a remote area.

17. The method of claim 11 further comprising the sensing of the profile being while the sensing platform is moving whereby the sensed profile sweeps through the atmosphere.

* * * * *